United States Patent [19]
Knodel et al.

[11] Patent Number: 5,258,120
[45] Date of Patent: Nov. 2, 1993

[54] DISK FILTER

[75] Inventors: Waldemar R. Knodel, Pentling; Norbert Einoder, Tegernheim, both of Fed. Rep. of Germany

[73] Assignee: Heinrich Fiedler GmbH & Co KG, Regensburg, Fed. Rep. of Germany

[21] Appl. No.: 797,587

[22] Filed: Nov. 25, 1991

[30] Foreign Application Priority Data

Apr. 17, 1991 [DE] Fed. Rep. of Germany ....... 9104669

[51] Int. Cl.⁵ ............................................. B01D 33/23
[52] U.S. Cl. .................... 210/232; 210/331; 210/347; 210/486; 210/498
[58] Field of Search ............... 210/232, 331, 347, 486, 210/498, 330, 345, 459, 463, 487; 285/402

[56] References Cited

U.S. PATENT DOCUMENTS

| | | | |
|---|---|---|---|
| 2,813,632 | 11/1957 | Muller | 210/486 |
| 3,317,050 | 5/1967 | Daman | 210/331 |
| 3,471,026 | 10/1969 | Riker | 210/331 |
| 3,960,729 | 6/1976 | Peterson et al. | 210/331 |
| 4,688,833 | 8/1987 | Todd | 285/402 |
| 4,728,423 | 3/1988 | Kuwajima | 210/486 |
| 4,968,423 | 11/1990 | McKale et al. | 210/486 |

FOREIGN PATENT DOCUMENTS 8904306  3/1989  Fed. Rep. of Germany.
472540   9/1937  United Kingdom ................ 210/331

Primary Examiner—Matthew O. Savage
Attorney, Agent, or Firm—Henry M. Feiereisen

[57] ABSTRACT

A disk filter for filtering solids from free-flowing material includes a hollow shaft and a plurality of filter segments arranged about the hollow shaft, with each filter segment including a top part and a bottom part connected to the top part such as to define a passageway for the material to be filtered. At the radial inner end face, each filter segment is detachably secured to the hollow shaft via an interposed connector assembly which includes two pipes telescopically nested within each other and detachable secured with each other via a bayonet lock or other detachable securement so as to allow each filter segment to be removed and attached from the outer end face of the filter segment. One of the pipe is mounted to the filter segment via a truncated cone shaped intermediate member and the other pipe is attached to the hollow shaft.

14 Claims, 4 Drawing Sheets

DISK FILTER

BACKGROUND OF THE INVENTION

The present invention refers to a disk filter, and in particular to a disk filter of the type having a plurality of single disk filter segments.

Disk filters made of filter segments are known and used in a wide range of technical fields for filtering or separating solids from free-flowing materials, e.g. for dewatering suspensions, paper pulp or the like. Each filter segment includes a top element and a bottom element which are joined together such as to attain a closed passageway expanding from inlet to outlet and are provided with perforations at their top side and bottom side. In order to have sufficient stability, conventional disk filters require filter segments of considerable wall thickness and/or the provision of a great number of reinforcing ribs. Moreover, the replacement or exchange of individual filter segments, e.g. to remove filter cake, is complicated and time consuming, as it requires the use of special tools.

SUMMARY OF THE INVENTION

It is an object of the present invention to provide an improved disk filter obviating the afore-stated drawbacks.

In particular, it is an object of the present invention to provide an improved disk filter in which individual filter segments can easily and rapidly be exchanged without adversely affecting the stability and which is characterized by an increased stiffness at reduced wall thickness.

These objects, and others, which will become apparent hereinafter, are attained in accordance with the present invention by detachably securing the filter segments to the hollow shaft via an interposed connector assembly to allow each filter segment to be removed and attached from the radial outer end face of the filter segment.

Preferably, the connector assembly includes two pipes telescopically nested within each other and detachable secured with each other via a bayonet lock or other detachable securement, with one radial outer pipe being connected to the radial inner end face of the filter segment and with one radial inner pipe being connected to the hollow shaft.

Preferably, the bayonet lock is attained by a bolt which projects radially from the outer surface area of the outer pipe which is connected to the filter segment and is engageable in a L-shaped slot of the inner pipe which is attached to the hollow shaft.

Through detachably securing each filter segment via such a bayonet lock, each filter segment can be grasped from outside, i.e. from the radial outer end face of the filter segment, and easily be removed by turning the segment about the longitudinal axis and pulling it in radial direction off the hollow shaft. There is no requirement to use special tools for loosening several screws which conventionally extend over the entire length of the filter segment. Rather, the removal of filter segments requires only a simple turning action without any particular tools and thus can be carried out in a short time. Insertion of a new filter segment is simply done in reverse sequence by pushing the segment with its pipe into the complementary pipe of the hollow shaft and turning the bolt in the slot. The bolt self-locks in the L-shaped slot because the slot section, which extends transversely to the axial slot section, is inclined toward the horizontal at a suitable angle, which is the angle between both force-transmitting surfaces, corresponding to the definition of the lead of screw threads. A self-locking of the bolt is attained at an angle ranging between 0° and 12° depending on the material used.

Along a major portion of their outer surface, both telescopically arranged pipes have a same outer diameter and same inner diameter. In order to allow the telescopic connection, the radially outer pipe which is connected to the filter segment has a pipe section of reduced outer diameter while the radially inner pipe which is securely mounted to the hollow shaft has a pipe section of reduced inner diameter. In this manner, both pipes can slide within each other. Suitably, a shoulder is defined at the point where the outer pipe is supported by the inner pipe, with an annular seal being disposed upon the shoulder to resiliently receive the radial outer pipe when the latter slides within the inner pipe and exerts a certain force.

Suitably, the filter segment is connected to the outer pipe via an intermediate member of truncated cone shaped configuration which in front view tapers from the filter segment toward the outer pipe while in side view of the filter segment expands radially inwardly i.e. toward the outer pipe.

According to another feature of the present invention, the filter segments are provided with reinforcing perforations, with the ratio of free surface area to entire surface area being at least 50%. Suitably, the reinforced design of the perforations is attained by drawing or pushing a tool toward one side through the filter segment so that a collar is formed which projects beyond the plane of the filter segment. Through the provision of such perforations, the filter segments are considerably reinforced and stiffened so as to allow selection of reduced wall thickness and the use of fewer reinforcing ribs. Thus, the overall weight of the disk filter is significantly reduced. The rounded or collared edges of the perforations result also in a considerable extension of life of the plastic fabric which is stretched over the filter segments.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
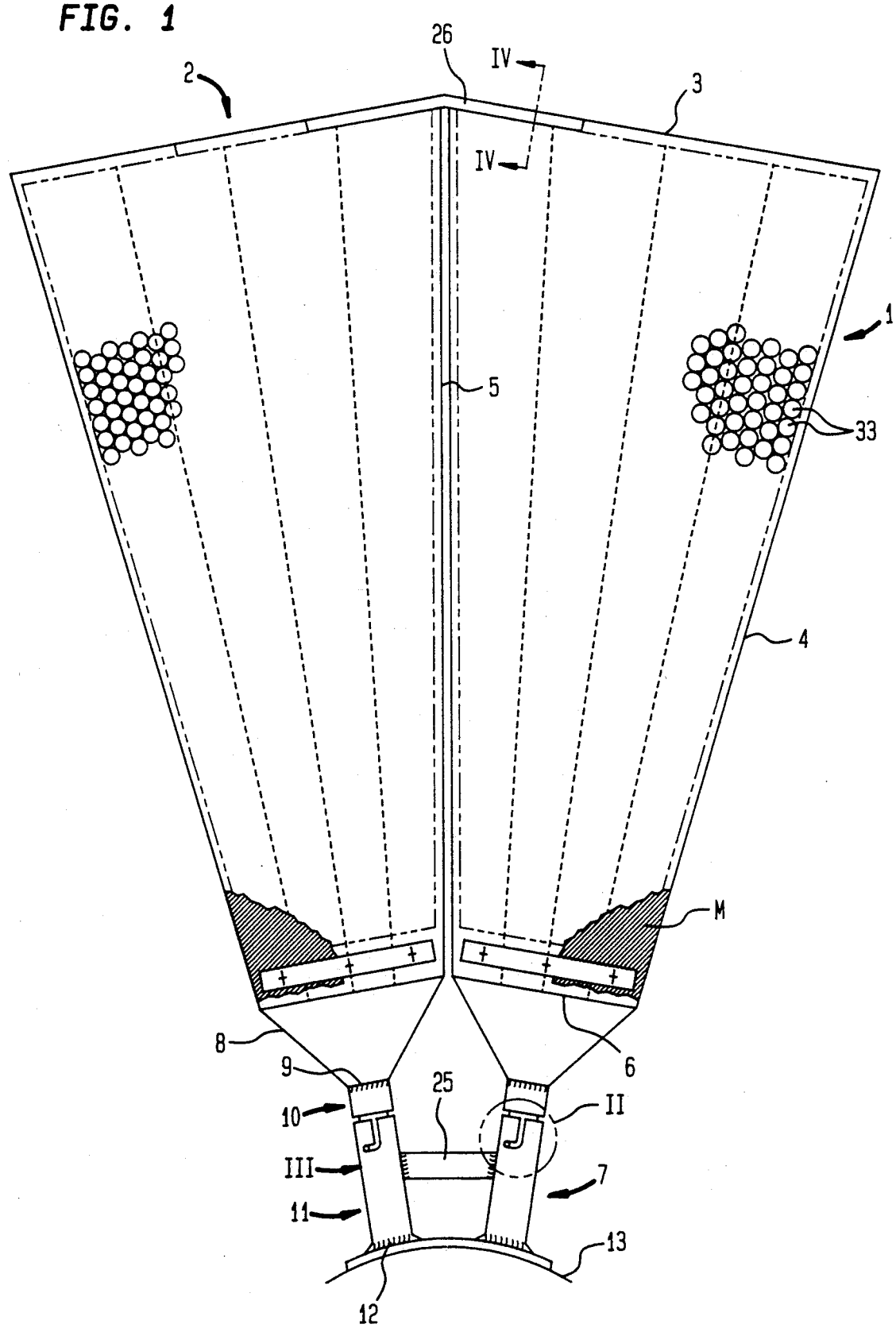
FIG. 1 is a fragmentary plan view of one embodiment of a disk filter according to the present invention, illustrating two filter segments and their linkage to a hollow shaft.

Throughout all the Figures, the same or corresponding elements are always indicated by the same reference numerals.

Referring now to the drawing and in particular to FIG. 1, there is shown a fragmentary plan view of one embodiment of a disk filter according to the present invention, with the disk filter including a plurality of adjoining filter segments, such as two adjoining filter segments 1, 2, which are arranged about the circumference of a hollow shaft 13. Each filter segment 1, 2 is of generally truncated cone shaped configuration, with a radial outer end face 3, longitudinal sides 4, 5 and a radial inner end face 6 which is connected to the hollow shaft 13 via a web or connector assembly generally designated by reference numeral 7. Stretched on each segment 1, 2 is a membrane M e.g. a plastic fabric through which material being filtered is drawn.

Figure 2:
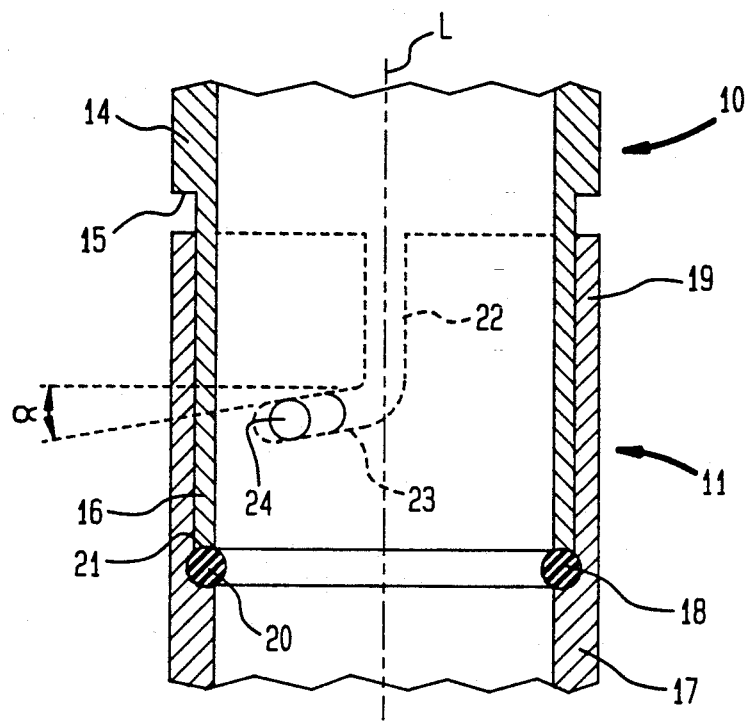
FIG. 2 is a sectional view taken substantially in circle II of the disk filter of FIG. 1, showing in detail a connector assembly for linking a filter segment to the hollow shaft.
Figure 3:
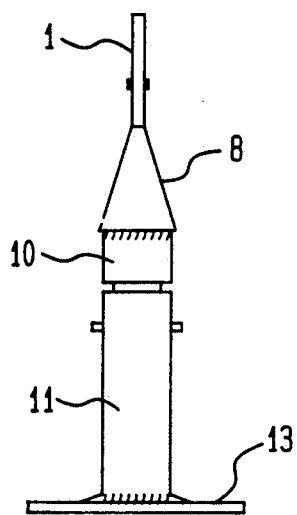
FIG. 3 is a side view of the connector assembly viewed in direction of arrow III in FIG. 1.

As shown in particular in FIG. 2, which shows a sectional view taken substantially in circle II of the disk filter of FIG. 1, the connector assembly 7 comprises a radial outer pipe generally designated by reference numeral 10 and a radial inner pipe generally designated by reference numeral 11. The outer pipe 10 is of constant inner diameter and includes an upper section 14 of greater wall thickness and a lower section 16 of reduced outer diameter so that a shoulder 15 is defined at the junction of the upper section 14 to the lower section 16. The outer pipe 10 is fixedly secured, e.g. through welding, to the narrow end 9 of a truncated cone shaped intermediate member 8, the wider end of which being fixedly secured to the inner end face 6 of the filter disk segment 1, 2. A comparison of FIGS. 1 and 3 shows that in front view the intermediate member 8 tapers toward the connector assembly 7 while in side view, i.e. in a view turned by 90°, the intermediate member 8 expands toward the connector assembly 7.

The inner pipe 11 includes a lower section 17 of greater wall thickness and an upper section 19 which is of reduced inner diameter. At the junction between the lower section 17 to the upper section 19 is a shoulder 18 which supports an annular seal or gasket 20. Thus, the outer pipe 10 is nested within the inner pipe 11 to attain a telescopic connection, with the lower end face 21 of the lower section 16 of pipe 10 bearing upon the seal 20 after assembling the disk filter as will be described furtherbelow. With its radial inner end face 12 (FIG. 1), the lower pipe section 17 of pipe 11 is fixedly secured, e.g. through welding, with the hollow shaft 13.

The inner pipe 11 is further provided at the outer surface area thereof with an essentially L-shaped slot, with one slot section 22, extending downwardly in direction of the longitudinal axis L of the connector assembly 7, from the perimeter of the inner pipe 11, and with the other slot section 23 extending transversely to the longitudinal axis L and slightly downwardly at an angle α which depending on the used material is in the range between 0° and 12°, i.e. greater than 0° and smaller than 12°. Engageable in this L-shaped slot 22, 23 is a bolt or pin 24 which is fixedly secured to the outer surface area of pipe 10. Thus, pipe 10 can telescopically be inserted and slid within pipe 11, with bolt 24 being guided and locked in the L-shaped slot 22, 23 in form of a bayonet lock or turn-lock fastener mechanism. When inserting sliding pipe 10 within the pipe 11 and twisting it, the bolt 24 self-locks by virtue of the inclination of the slot section 23 relative to the horizontal. In the locked position, the end face 21 of the lower section 16 of pipe 10 elastically rests upon the seal 20 to attain a certain bias of the connection. Through suitable application of force, the bolt 24 can be released within the slot 23.

Persons skilled in the art will understand that the bayonet lock as attained by the cooperation of the L-shaped slot 22, 23 and the bolt 24 is made by way of example only. It is certainly possible to provide a different fastening mechanism between the telescopically joined pipes 10, 11 by which the filter segments can be detachably secured to the hollow shaft 13. For example, the pipes 10, 11 after being pushed in position may be detachably secured with each other by means of a screw.

As is further shown in FIG. 1, connector assemblies 7 of neighboring filter segments 1, 2 are connected by a cross piece 25 to increase the stiffness of the filter segments. Each cross piece 25 may be fixedly secured to the respective connector assembly 7 through welding.

Figure 4:
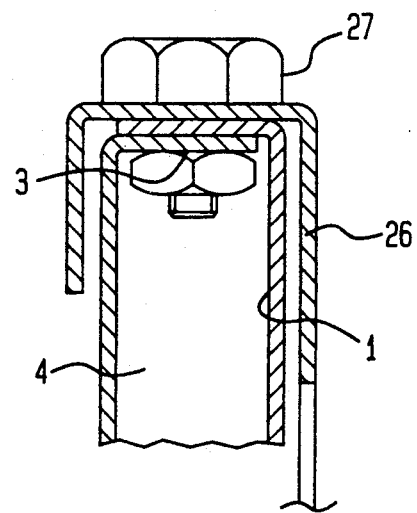
FIG. 4 is a sectional view taken along the line IV—IV in FIG. 1.

In order to further improve the stability of the disk filter, each two neighboring filter segments 1, 2, are respectively joined together along their radial end face 3 by a rail 26 which extends from the facing corner area of the neighboring segments 1, 2 over a portion of the end face 3 of the segments 1, 2. As shown in FIG. 4, which is a sectional view taken along the line IV—IV in FIG. 1, the rail 26 is of U-shaped configuration and is fixedly secured to the radial end face 3 by means of a screw 27.

It will be appreciated by persons skilled in the art that the disk filter must contain further mechanical apparatus which does not appear in the foregoing Figures. For example, the disk filter segments are actuated by a suitable drive to slowly rotate the disk filter in a tank containing the material to be filtered. Also, the disk filter is operatively connected to vacuum lines and return conduits. However, this apparatus, like much other necessary apparatus, is not part of the invention, and has been omitted from the Figures for the sake of simplicity.

If it is desired to exchange or replace one of the filter segments of the disk filter, it is now only necessary to detach rail 26 and subsequently to turn or twist the respective segment about the longitudinal axis thereof in order to release the bolt 24 inside the slot 23. Then, the segment can be pulled out in radial direction. Insertion of a new segment is attained in reversed sequence by aligning the bolt 24 with the slot section 22 and by pushing the segment downwards and then—after reaching the end of slot 22—by twisting the segment to allow the bolt 24 to lock inside slot section 23.

Figure 6:
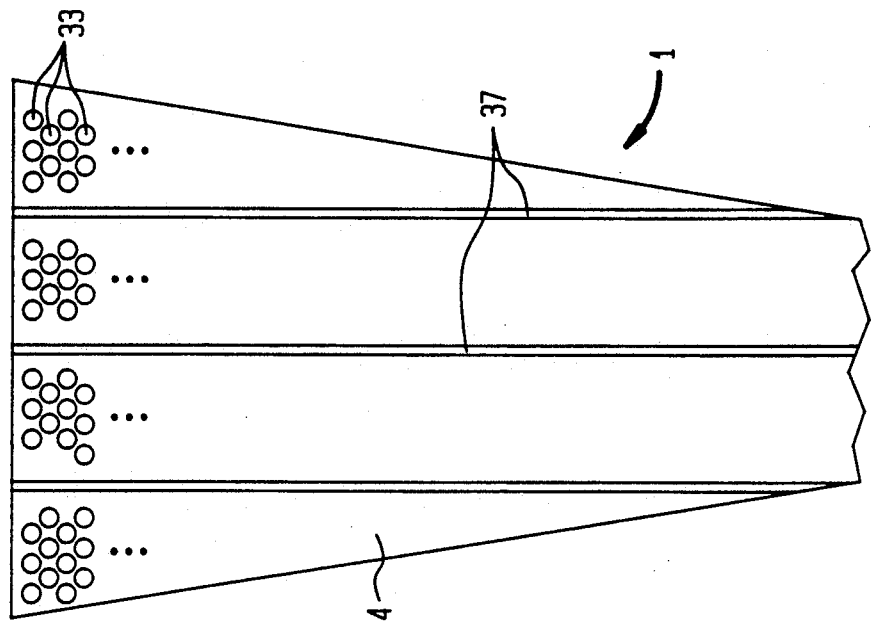
FIG. 6 is a plan view of a disk filter segment in accordance with the present invention.
Figure 7:
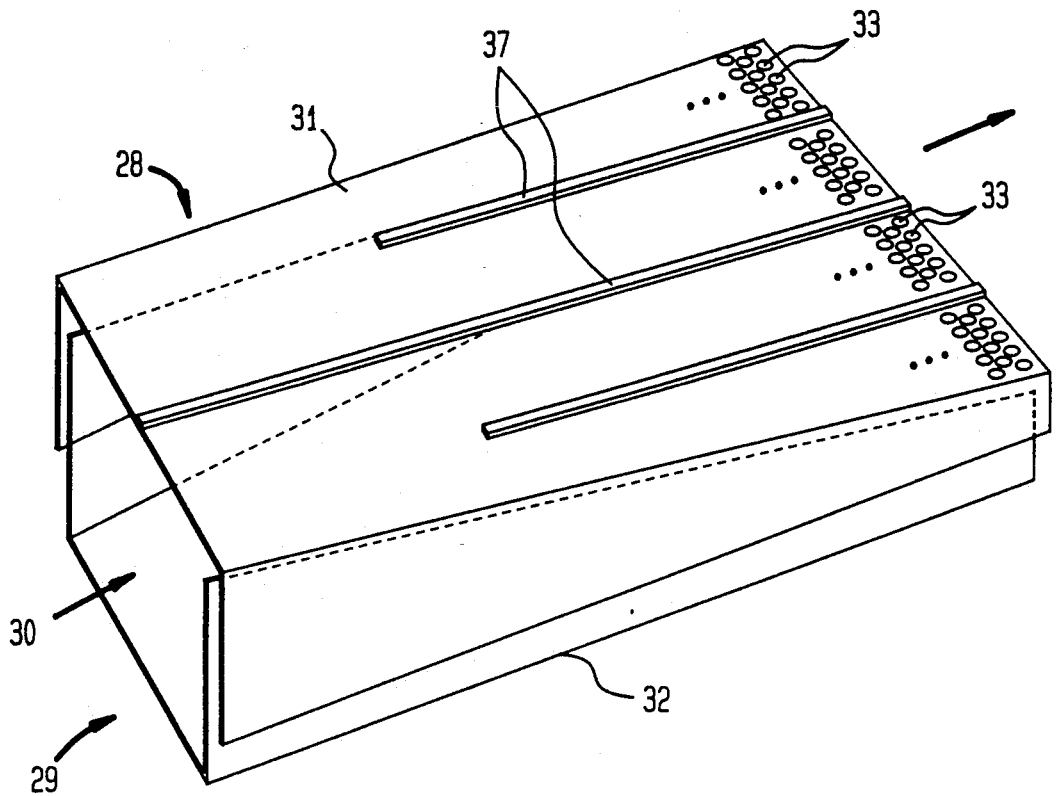
FIG. 7 is a schematic perspective view of the disk a filter segment of FIG. 6.
Figure 8:
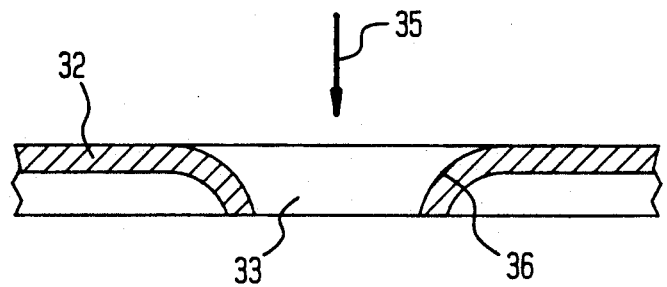
FIG. 8 is a fragmentary sectional view of the disk filter segment of FIG. 7, illustrating in detail a perforation on an enlarged scale.

FIGS. 6–8 show an example of a disk filter segment in accordance with the present invention. As illustrated in particular in FIG. 7, the disk filter segment 1 is made of a U-shaped top element generally designated by reference numeral 28 and a U-shaped bottom element generally designated by reference numeral 29 and nested within the top element 28 such that a passageway for material to be filtered is defined, as indicated by arrow 30, with the passageway expanding from the inlet side toward the outlet side. Along the top side 31 of top element 28 and along the bottom side 32 of bottom element 29 are rows of reinforcing circular perforations 33 which are spaced in longitudinal direction of the filter segment 1 and allow a discharge of filtered-out liquid. Preferably, the ratio of free surface area to overall surface area is about 50% or more. Even though these perforations 33 are shown as being of circular configuration, it will be understood that they may also be of any other suitable configuration.

As shown in FIG. 8, which shows a fragmentary sectional view of the disk filter segment 1 and illustrates in detail an exemplified perforation 33 on an enlarged scale, it can be seen that the perforation 33 is made under material deformation by drawing or pushing a suitable shaping tool or die in direction of arrow 35 through the filter segment such that the material is not cleanly cut off but is deformed to create a collar 36 in drawing or pushing direction. In this manner the stiffness of the filter segment 1 is considerably increased as the collar 36 projects beyond the plane of the bottom side 32 or top side 31 of the filter segment.

Suitably, as further shown e.g. in FIG. 7, the top side 31 as well as the bottom side 32 are each provided with one or more ribs 37 extending in longitudinal direction to further reinforce the filter segment 1. However, by providing the perforations 33 with reinforcing collars 36, the number of attached reinforcing ribs 37 can be kept small and the filter segments can be selected at reduced wall thickness, compared to conventional disk filters.

Figure 5:
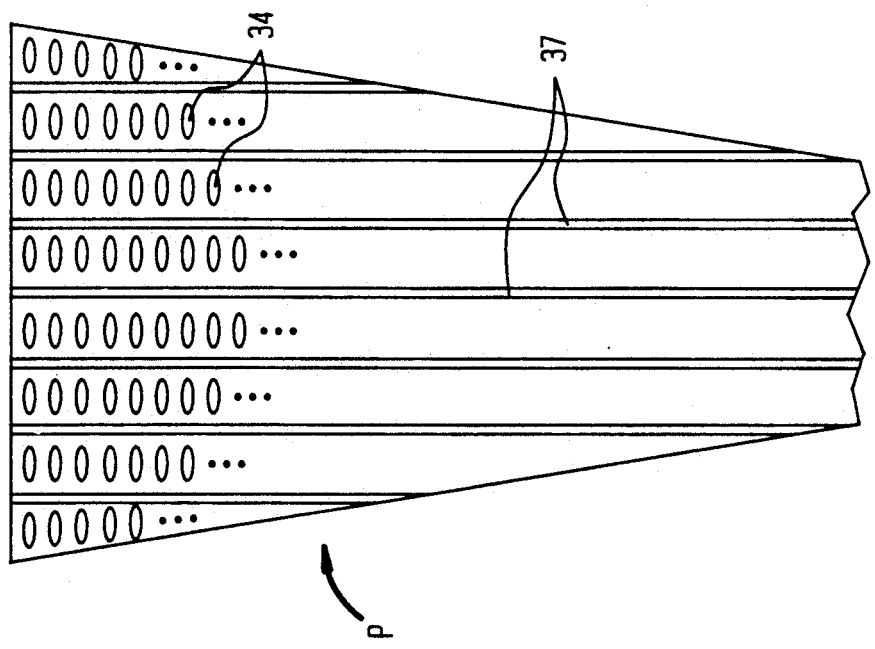
FIG. 5 is a plan view of a conventional disk filter segment.

FIG. 5 shows a plan view of such a conventional disk filter segment P for comparative purposed. The filter segment P includes oblong perforations 34 which are simply punched out to provide a clean perforation without any deformation of the material. Therefore, these perforations 34 do not impart any stiffness to the filter segments P so that a great number of closely spaced reinforcing ribs 37 are required to provide the filter segments with a sufficient stability.

It will be appreciated that the top side 31 or bottom side 32 of each filter segment 1, 2 may have perforations which are partly drawn or pushed through in accordance with FIG. 8 and partly cut or punched in accordance with FIG. 5. A selection of different types of perforations depends on the desired ratio of stiffness to free surface area, and the provision of different perforations may be alternated in accordance with a predetermined pattern. An exemplary pattern includes alternate rows of drawn or reinforcing perforations and rows of non-drawn or non-reinforcing perforations.

While the invention has been illustrated and described as embodied in a disk filter, it is not intended to be limited to the details shown since various modifications and structural changes may be made without departing in any way from the spirit of the present invention.

What is claimed as new and desired to be protected by Letters Patent is set forth in the appended claims:

1. A disk filter for filtering solids from free-flowing material, comprising:
   a hollow shaft having a longitudinal axis;
   means for rotating said hollow shaft about said longitudinal axis;
   a plurality of filter segments each having one end arranged circumferentially about said hollow shaft and an outer edge spaced radially outwardly of said one end and said hollow shaft, each of said filter segments having opposed first and second sides extending between said one end and said outer edge, said first and second sides being connected to define a passageway for the material to be filtered; and
   connecting means interposed between said one end of each filter segment and said hollow shaft for fluidly connecting said passageway to an interior of said hollow shaft, wherein said connecting means includes a first pipe telescopically nested within a second pipe and detachably secured with each other via a bayonet lock, with said first pipe being connected to said filter segment and with said second pipe being connected to said hollow shaft, wherein said first pipe has an outer surface area and includes a pin projecting radially from said outer surface area, and said second pipe is provided with an L-shaped slot engaged by said pin to form said bayonet lock.

2. A disk filter as defined in claim 1 wherein said L-shaped slot has one slot section slantingly extending toward said hollow shaft so that said pin self-locks when being turned in said one slot section.

3. A disk filter as defined in claim 2 wherein said one slot section is slanted at an angle ranging from greater than 0° to smaller than 12°.

4. A disk filter as defined in claim 1, and further comprising a truncated cone shaped intermediate conduit member having one end attached to said first pipe and the other end attached to the one end of a respective said filter segment, said intermediate conduit member having first opposing sides tapering toward said first pipe and second opposing sides expanding toward said first pipe, said one end of the intermediate conduit member having a circular cross section of a diameter corresponding to the diameter of said first pipe.

5. A disk filter as defined in claim 1 wherein said first pipe has a first pipe section with an outer diameter and a second section of reduced outer diameter so as to define a circular shoulder at the junction of said first pipe section to said second pipe section, said second pipe having an outer diameter corresponding to the outer diameter of said first pipe section of said first pipe.

6. A disk filter as defined in claim 1, and further comprising a cross piece joining together neighboring pairs of said second pipes.

7. A disk filter as defined in claim 1 and further comprising a plurality of connecting rails, each connecting rail joining a respective pair of neighboring filter segments along their respective outer edges, bolt means for attaching a respective said connecting rail to a respective outer edge of said neighboring filter segments, and wherein the outer edges of a said pair of neighboring filter segments extend and meet to form a corner point, and a said connecting rail extends from said corner point over a portion of the outer edges of each respective said pair of neighboring filter segments.

8. A disk filter as defined in claim 7 wherein said rail is of U-shaped configuration.

9. A disk filter as defined in claim 1 wherein said second pipe is welded to said hollow shaft.

10. A disk filter as defined in claim 1 wherein said first pipe has a first pipe section with an outer diameter and a second section of reduced outer diameter, said second pipe having a first pipe section of an inner diameter and a second pipe section of reduced inner diameter so as to define a shoulder at the junction of said first pipe section to said second pipe section for providing a stop for said second pipe section of said first pipe when said one pipe is inserted in said second pipe.

11. A disk filter as defined in claim 10, and further comprising a seal placed about said shoulder and abutted by said second pipe section of said first pipe.

12. A disk filter as defined in claim 1, wherein said first side and said second side each have a total surface area and are provided with perforations, and the ratio of the area of said perforations to said total surface area is at least 50 percent.

13. A disk filter as defined in claim 12 wherein said perforations are of circular configuration.

14. A disk filter as defined in claim 12 wherein said perforations have a circumferential edge which is inwardly deformed to provide a collar.

* * * * *